(12) United States Patent
Laemmle

(10) Patent No.: US 11,498,439 B2
(45) Date of Patent: Nov. 15, 2022

(54) INDUCTION CHARGING DEVICE

(71) Applicant: Mahle International GmbH, Stuttgart (DE)

(72) Inventor: Christopher Laemmle, Stuttgart (DE)

(73) Assignee: Mahle International GmbH

( * ) Notice: Subject to any disclaimer, the term of this patent is extended or adjusted under 35 U.S.C. 154(b) by 140 days.

(21) Appl. No.: 16/978,676

(22) PCT Filed: Mar. 4, 2019

(86) PCT No.: PCT/EP2019/055293
§ 371 (c)(1),
(2) Date: Sep. 4, 2020

(87) PCT Pub. No.: WO2019/170594
PCT Pub. Date: Sep. 12, 2019

(65) Prior Publication Data
US 2020/0398687 A1    Dec. 24, 2020

(30) Foreign Application Priority Data
Mar. 8, 2018  (DE) .......................... 102018203555.5

(51) Int. Cl.
*B60L 53/302*   (2019.01)
*H02J 50/10*   (2016.01)
(Continued)

(52) U.S. Cl.
CPC ............. *B60L 53/302* (2019.02); *B60L 53/12* (2019.02); *H01F 27/2876* (2013.01);
(Continued)

(58) Field of Classification Search
CPC .......... B60L 53/302; H02J 50/10; H02J 50/70
(Continued)

(56) References Cited

U.S. PATENT DOCUMENTS 9,662,992 B2    5/2017   Doepke
9,787,138 B2   10/2017   Ichikawa
(Continued)

FOREIGN PATENT DOCUMENTS

DE    102011088112 A1    6/2013
DE    102017200465 A1   11/2017
(Continued)

OTHER PUBLICATIONS

English abstract for JP-2012156083.

*Primary Examiner* — Suchin Parihar
(74) *Attorney, Agent, or Firm* — Fishman Stewart PLLC

(57) ABSTRACT

The present disclosure describes an induction charging device for a partially or fully electrically operated motor vehicle. The induction charging device includes at least one charging coil and a temperature-control assembly including a fluid pipe for a liquid fluid. The charging coil is inductively couplable to a primary coil such that a battery can be inductively charged in the motor vehicle. The charging coil is heat-transmittingly connected to the fluid pipe such that the waste heat from the charging coil can be transmitted to the fluid. The induction charging device further includes a metal shielding plate for shielding electromagnetic field emissions, and a ferrite assembly for directing an electromagnetic alternating field. The charging coil is arranged in (Continued)

the fluid pipe such that the fluid can flow around it on all sides. The charging coil is secured in the fluid pipe directly or via a retaining device.

20 Claims, 2 Drawing Sheets

(51) Int. Cl.
*H02J 50/70* (2016.01)
*B60L 53/12* (2019.01)
*H01F 27/28* (2006.01)
*H02J 7/02* (2016.01)
*H01F 27/36* (2006.01)

(52) U.S. Cl.
CPC .............. *H01F 27/363* (2020.08); *H02J 7/02* (2013.01); *H02J 50/10* (2016.02); *H02J 50/70* (2016.02)

(58) Field of Classification Search
USPC .......................................................... 320/108
See application file for complete search history.

(56) References Cited

U.S. PATENT DOCUMENTS

| 2013/0154553 | A1* | 6/2013 | Steele | B60M 7/003 |
| | | | | 320/108 |
| 2016/0173299 | A1* | 6/2016 | Islam | H04L 25/0296 |
| | | | | 375/232 |
| 2017/0145886 | A1* | 5/2017 | Crawford | H05B 6/365 |
| 2017/0253129 | A1* | 9/2017 | Garcia | H01F 27/2876 |
| 2017/0338023 | A1* | 11/2017 | Ansari | H02J 7/0042 |
| 2018/0141451 | A1* | 5/2018 | Totsuka | H02K 3/14 |
| 2018/0254136 | A1* | 9/2018 | Ueda | H02J 50/005 |
| 2019/0366858 | A1* | 12/2019 | Franz | H01F 38/14 |
| 2020/0398687 | A1* | 12/2020 | Laemmle | H01F 27/36 |
| 2021/0114471 | A1* | 4/2021 | Ye | H01F 38/14 |
| 2021/0195811 | A1* | 6/2021 | Wiebelt | H02J 50/80 |

FOREIGN PATENT DOCUMENTS

| EP | 3196903 A1 | 7/2017 |
| JP | 2012156083 A | 8/2012 |
| WO | WO-17033859 A1 | 3/2017 |

* cited by examiner

INDUCTION CHARGING DEVICE

CROSS-REFERENCE TO RELATED APPLICATIONS

This application claims priority to International Patent Application No. PCT/EP2019/055293 filed Mar. 4, 2019, which also claims priority to Germany Patent Application DE 10 2018 203 555.5 filed Mar. 8, 2018, the contents of each of which is hereby incorporated by reference in its entirety.

TECHNICAL FIELD

The invention relates to an induction charging device for a partially or fully electrically operated motor vehicle.

BACKGROUND

Induction charging devices are already known from the prior art and are used for the contact-free charging of a battery in a motor vehicle. An external primary coil is thereby inductively coupled to a secondary coil in the induction charging device. An alternating current, which generates an electromagnetic alternating field around the primary coil, flows through the primary coil. In the secondary coil, the electromagnetic alternating field induces an alternating current, which is rectified by means of the power electronics and is supplied to the battery.

When charging, a waste heat is generated in the primary coil and in the secondary coil due to energy losses. The waste heat generated in the secondary coil can in particular damage the power electronics in the induction charging device and has to be discharged to the outside. For this purpose, a cooling assembly, through which a cooling fluid can flow, can be arranged on the secondary coil. The cooling assembly is thereby heat-transmittingly arranged on the secondary coil, so that the waste heat generated in the secondary coil is transmitted to the cooling fluid. The waste heat can then be dissipated into the environment or can be used to heat a lubricant in the motor vehicle, as it is described, for example, in DE 10 2011 088 112 A1. In the alternative or in addition, a cooling assembly can also be provided at the primary coil.

Disadvantageously, the secondary coil can usually not be sufficiently cooled, whereby the charging power of the induction charging device is negatively impacted.

SUMMARY

It is thus the object of the invention to specify an improved or at least alternative embodiment for an induction charging device of the generic type, in the case of which the described disadvantages are overcome.

This object is solved according to the invention by means of the subject matter of the independent claim(s). Advantageous embodiments are subject matter of the dependent claims.

A generic induction charging device for a partially or fully electrically operated motor vehicle has at least one charging coil and a temperature-control assembly comprising a fluid pipe, through which a liquid fluid can flow. The charging coil can be inductively coupled to a primary coil such that a battery can be inductively charged in the motor vehicle. The charging coil is thereby heat-transmittingly connected to the fluid pipe of the temperature-control assembly such that the waste heat from the charging coil can be transmitted to the fluid in the fluid pipe of the temperature-control assembly. The induction charging device further has a metal shielding plate for shielding electromagnetic field emissions, and a ferrite assembly for directing the electromagnetic alternating field, which are arranged on the vehicle side on the charging coil. According to the invention, the charging coil is arranged in the fluid pipe of the temperature-control assembly such that the fluid can flow around it on all sides, and in the fluid pipe is secured directly to the latter or by means of the retaining device.

The ferrite assembly is arranged on the vehicle side on the charging coil such that, in an installed state of the induction charging device, the ferrite assembly is arranged between the motor vehicle and the charging coil. Advantageously, the fluid flows around the charging coil on all sides such that the waste heat generated in the charging coil can be discharged directly to the fluid in the fluid pipe.

The charging coil is thus cooled better, and the charging power of the induction charging device is increased in an advantageous manner. Damages to the charging coil caused by an overheating can further be prevented thereby. The retaining device can moreover secure the charging coil in the fluid pipe such that a shifting of the charging coil relative to the metal shielding plate and the ferrite assembly can be prevented in the case of shocks or vibrations. In the alternative, the ferrite assembly in the fluid pipe can be secured directly to the latter—for example adhered, screwed, or clamped to the fluid pipe.

Advantageously, it can be provided that the ferrite assembly is arranged in the fluid pipe of the temperature-control assembly such that the fluid can flow around it on all sides and in the fluid pipe is secured directly to the latter or by means of the retaining device. The waste heat generated in the ferrite assembly can then advantageously be discharged directly to the fluid in the fluid pipe, and the ferrite assembly is cooled better. The ferrite assembly can have, for example, a ferrite plate or can comprise several individual plates, which in the fluid pipe are secured directly to the latter or by means of the retaining device and are aligned relative to the charging coil. The individual plates can thereby be arranged next to one another—for example spaced apart or so as to laterally abut against one another—and can partially or completely cover the charging device on the vehicle side. The individual plates can further differ from one another in their shape and in their size. The retaining device as well as the direct connection of the ferrite assembly to the fluid pipe prevent a shifting of the ferrite assembly relative to the metal shielding plate and the charging coil in the case of shocks or vibrations.

In the case of a further development of the fluid pipe, it is advantageously provided that the fluid pipe has a shell-shaped metallic cover and a shell-shaped lower shell, which are secured to one another in a fluid-tight manner. For this purpose, the cover and the lower shell can be adhered, welded, clamped, or screwed to one another. On the vehicle side, the metallic cover thereby encloses the charging coil towards the lower shell, and forms the metal shielding plate of the induction charging device. In this context, "on the vehicle side" means that, in an installed state of the induction charging device, the cover is arranged between the motor vehicle and the charging coil. In the alternative, the fluid pipe can have a shell-shaped, non-metallic cover, for example of plastic, and a shell-shaped lower shell, which are secured to one another in a fluid-tight manner—for example adhered, welded, clamped, or screwed to one another.

The cover is in direct contact with the fluid, so that the cover or the metal shielding plate, respectively, can also be cooled directly by means of the fluid. The metal shielding plate can be cooled effectively and the number of the individual parts in the induction charging device can moreover also be reduced in this advantageous manner. The cover or the metal shielding plate, respectively, can then be metallic—for example of copper or aluminum. The lower shell can be formed from an electrical insulator—such as, for example, an electrically insulating plastic—so as not to negatively influence the electromagnetic alternating field in the induction charging device.

In the case of a further development of the induction charging device according to the invention, it is provided that the induction charging device has an oscillating circuit unit and/or a power electronics unit. Advantageously, the oscillating circuit unit and/or the power electronics unit of the induction charging device can be secured on the vehicle side or on the charging coil side on the metal shielding plate. "On the vehicle side" thereby means that, in an installed state of the induction charging device, the oscillating circuit unit and/or the power electronics unit are arranged between the motor vehicle and the metal shielding plate. In this context, "on the charging coil side" means that the oscillating circuit unit and/or the power electronics unit are arranged between the charging coil and the metal shielding plate. The oscillating circuit unit and/or the power electronics unit can also be cooled via the cooled metal shielding plate in this way. In the alternative, it can be provided that the oscillating circuit unit and/or the power electronics unit of the induction charging device are arranged in the fluid pipe of the temperature-control assembly such that the fluid can flow around them on all sides, and in the fluid pipe are secured directly to the latter or by means of the retaining device. The waste heat generated in the oscillating circuit unit and/or the power electronics unit can then be discharged directly to the fluid in the fluid pipe, and the oscillating circuit unit and/or the power electronics unit are cooled better. The retaining device can moreover secure the oscillating circuit unit and/or the power electronics unit in the fluid pipe, and can prevent a shifting of the oscillating circuit unit and/or of the power electronics unit due to shocks and vibrations in the motor vehicle.

To avoid a short-circuit in the induction charging device, the charging coil and/or the oscillating circuit unit and/or the power electronics unit can be electrically insulated from the fluid. In the alternative or in addition, the fluid flowing in the fluid pipe can be an electrical insulator—for example an electrically non-conductive coolant or an electrically non-conductive oil.

In the case of an advantageous further development of the induction charging device according to the invention, it is provided that the induction charging device comprises the battery, to which the charging coil is conductively connected such that a battery direct current flows through the charging coil, and the charging coil forms a resistance heater for heating the fluid, which flows around the charging coil in the fluid pipe. In addition, a DC-DC converter can also be provided for increasing the heating power of the charging coil.

Advantageously, it can then be provided that the oscillating circuit unit and/or the power electronics unit of the induction charging device are arranged upstream of the charging coil in the fluid pipe such that the fluid in the fluid pipe can flow around the oscillating circuit unit and/or the power electronics unit upstream of the charging coil. The oscillating circuit unit and/or the power electronics unit can be cooled in the fluid pipe in this way, and the fluid can be heated around the charging coil and can be discharged from the fluid pipe only thereafter. The fluid can be capable of flowing through the fluid pipe of the temperature-control assembly from a fluid inlet to a fluid outlet, and the temperature-control assembly can be capable of being fluidically connected to a vehicle cooling system via the fluid inlet and via the fluid outlet of the fluid pipe.

In summary, the charging coil in the induction charging device according to the invention can be cooled effectively, and the charging power of the charging coil can advantageously remain elevated.

The induction charging device was described here for the use of the charging coil as a secondary coil. However, the induction charging device is also suitable for use of the charging coil as a primary coil without any limitation. For this purpose, the induction charging device can be arranged in such a way that the metal shielding plate for shielding electromagnetic field emissions and the ferrite assembly for directing the electromagnetic alternating field are arranged on the charging coil facing away from the vehicle.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
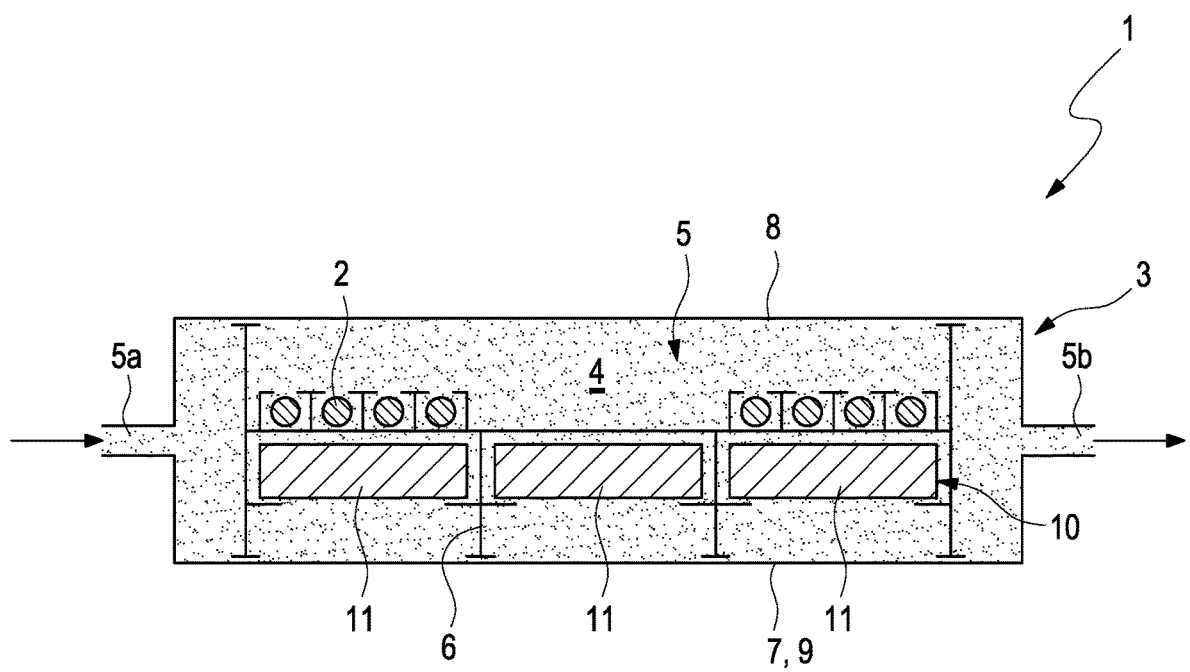
FIG. 1 shows a sectional view of an induction charging device according to the invention.

FIG. 1 shows a sectional view of an induction charging device 1 according to the invention for a partially or fully electrically operated motor vehicle. The induction charging device 1 has at least one charging coil 2 and a temperature-control assembly 3 comprising a fluid pipe 5, through which a fluid 4 can flow. The fluid 4 can flow through the fluid pipe 5 of the temperature-control assembly 3 from a fluid inlet 5a to a fluid outlet 5b, and the temperature-control assembly 3 can be fluidically connected to a vehicle cooling system—not shown here—via the fluid inlet 5a and via the fluid outlet 5b of the fluid pipe 5.

The charging coil 2 can be inductively coupled to a primary coil—not shown here—and is arranged in the fluid pipe 5. A retaining device 6 secures the charging coil 2 in the fluid pipe 5 and protects the charging coil 2 against shocks or vibrations in the motor vehicle. The fluid 4 flows around the charging coil 2 on all sides such that the waste heat generated in the charging coil 2 can be discharged directly to the fluid 4 in the fluid pipe 5. The charging coil 2 is thus cooled better and the charging power of the induction charging device 1 is increased in an advantageous manner. Damages to the charging coil 2 caused by an overheating can further be avoided thereby.

In this exemplary embodiment, the fluid pipe 5 has a shell-shaped cover 7 and a shell-shaped lower shell 8, which are secured to one another in a fluid-tight manner. For this purpose, the cover 7 and the lower shell 8 can be adhered, welded, clamped, or screwed to one another. On the vehicle side, the cover 7 thereby encloses the charging coil 2 towards the lower shell 8, and can be metallic—for example of copper or aluminum—or non-metallic—for example of plastic. The cover 7 thus forms a metal shielding plate 9 for shielding electromagnetic field emissions in the induction charging device 1. The lower shell 8 can be formed from an electrical insulator—such as, for example, an electrically insulating plastic—so as not to negatively influence the electromagnetic alternating field in the induction charging device 1. The fluid 5 flows around the cover 7 or the metal shielding plate 9, respectively, on one side such that the cover 7 or the metal shielding plate 9, respectively, is cooled directly by the fluid 4. Advantageously, the metal shielding plate 9 can thus be cooled effectively, and the number of the individual parts in the induction charging device 1 can be reduced.

To direct the electromagnetic alternating field, the induction charging device 1 further has a ferrite assembly 10, which are arranged on the charging coil 2. The ferrite assembly 10 is arranged in the fluid pipe 5 of the temperature-control assembly 3 such that the fluid 4 can flow around it on all sides, and is secured in the fluid pipe 5 by means of the retaining device 6. The retaining device 6 moreover defines a distance between the charging coil 2 and the ferrite assembly 10. The waste heat generated in the ferrite assembly 10 can then be discharged directly to the fluid 4 in the fluid pipe 5 in an advantageous manner, and the ferrite assembly 10 is cooled better. In this exemplary embodiment, the ferrite assembly 10 comprises several individual plates 11, which are secured in the fluid pipe 5 by means of the retaining device 6, and which are aligned relative to the charging coil 2. The retaining device 6 prevents a shifting of the ferrite assembly 10 relative to the metal shielding plate 9 and the charging coil 2 in the case of shocks or vibrations in the motor vehicle.

To avoid a short-circuit in the induction charging device 1, the charging coil 2 can be electrically insulated from the fluid 4. In the alternative or in addition, the fluid 4 flowing in the fluid pipe 5 can be an electrical insulator—for example, an electrically non-conductive coolant or an electrically non-conductive oil. If the induction charging device 1 is conductively connected to a battery—not shown here—and if a battery direct current flows through the charging coil 2, the charging coil 2 forms a resistance heater for heating the fluid, 4 which flows around the charging coil 2 in the fluid pipe 5.

Figure 2:
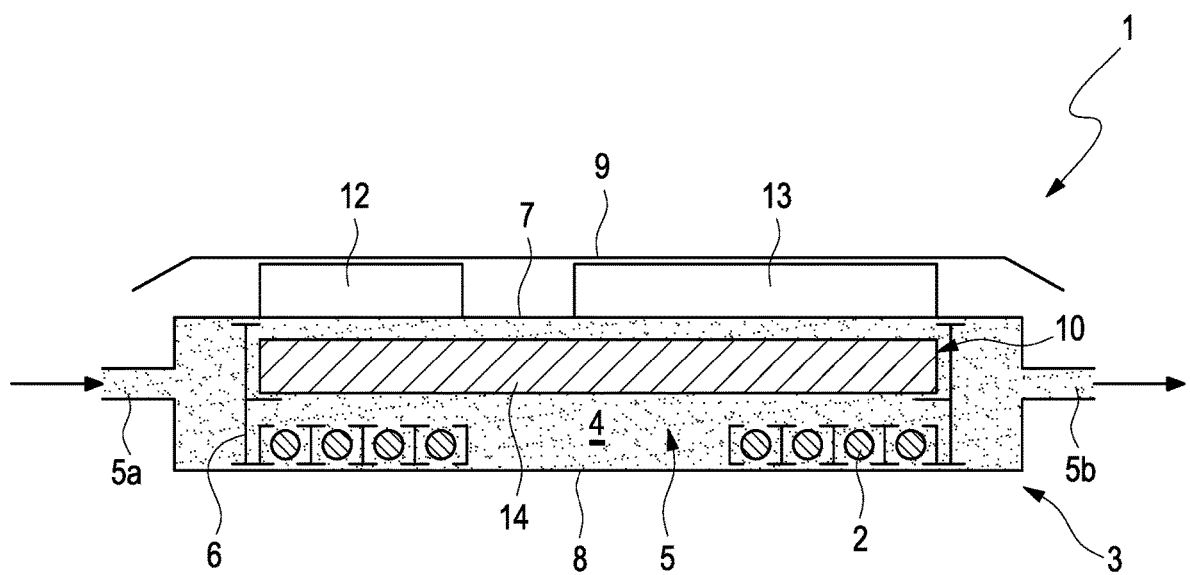
FIG. 2 shows a sectional view of an induction charging device comprising an oscillating circuit unit and comprising a power electronics unit, which are secured on the charging coil side to a metal shielding plate.

FIG. 2 shows a sectional view of the induction charging device 1 according to the invention. In this exemplary embodiment, the induction charging device 1 has an oscillating circuit unit 12 and a power electronics unit 13. In this exemplary embodiment, the metal shielding plate 9 is a separate component and is arranged on the vehicle side on the fluid pipe 5. Advantageously, the cover 7 of the fluid duct 5 is then formed from an electrical insulator—for example from an electrically non-conductive plastic. The oscillating circuit unit 12 and the power electronics unit 13 are secured on the charging coil side to the metal shielding plate 9 between the fluid duct 5 and the metal shielding plate 9, and are also cooled by the fluid 4 in the fluid pipe 5. In this exemplary embodiment, the ferrite assembly 10 is a ferrite plate 14, which is arranged on the vehicle side on the charging coil 2 in the fluid pipe 5. The ferrite plate 14 and the charging coil 2 are secured in the fluid duct 5 by means of the retaining device 6, and are protected against shocks or vibrations. Apart from that, the setup of the induction charging device 1 shown here corresponds to the setup of the induction charging device 1 shown in FIG. 1.

Figure 3:
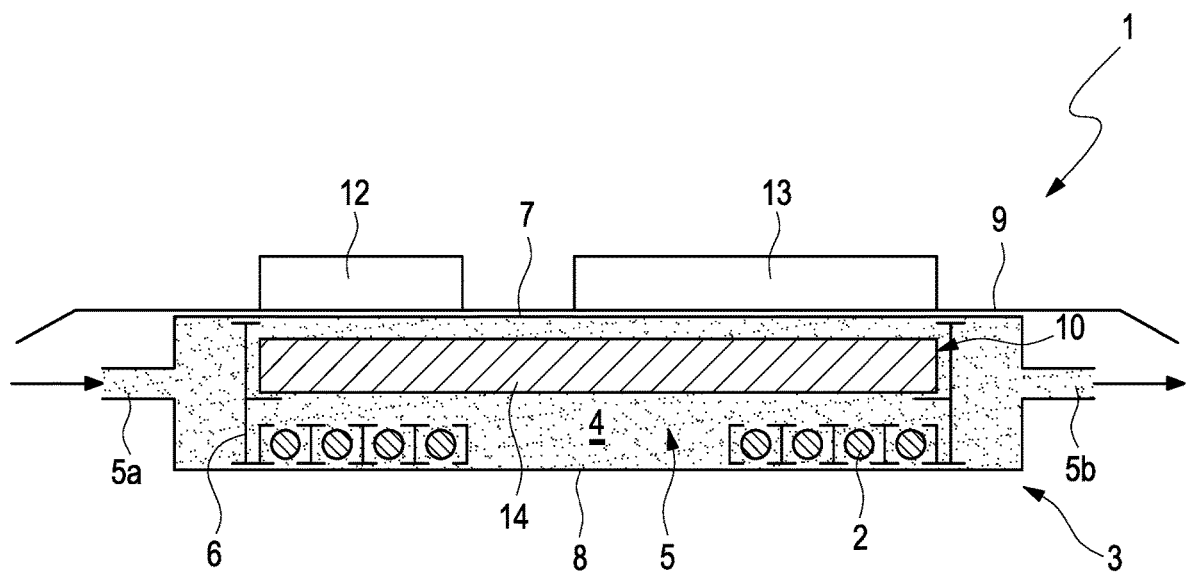
FIG. 3 shows a sectional view of an induction charging device comprising an oscillating circuit unit and comprising a power electronics unit, which are secured on the vehicle side to a metal shielding plate.

FIG. 3 shows a sectional view of the induction charging device 1 according to the invention. In this exemplary embodiment, the oscillating circuit unit 12 and the power electronics unit 13 are secured to the vehicle side on the metal shielding plate 9, which is heat-transmittingly connected to the cover 7. Apart from that, the setup of the induction charging device 1 shown here corresponds to the setup of the induction charging device 1 shown in FIG. 2.

Figure 4:
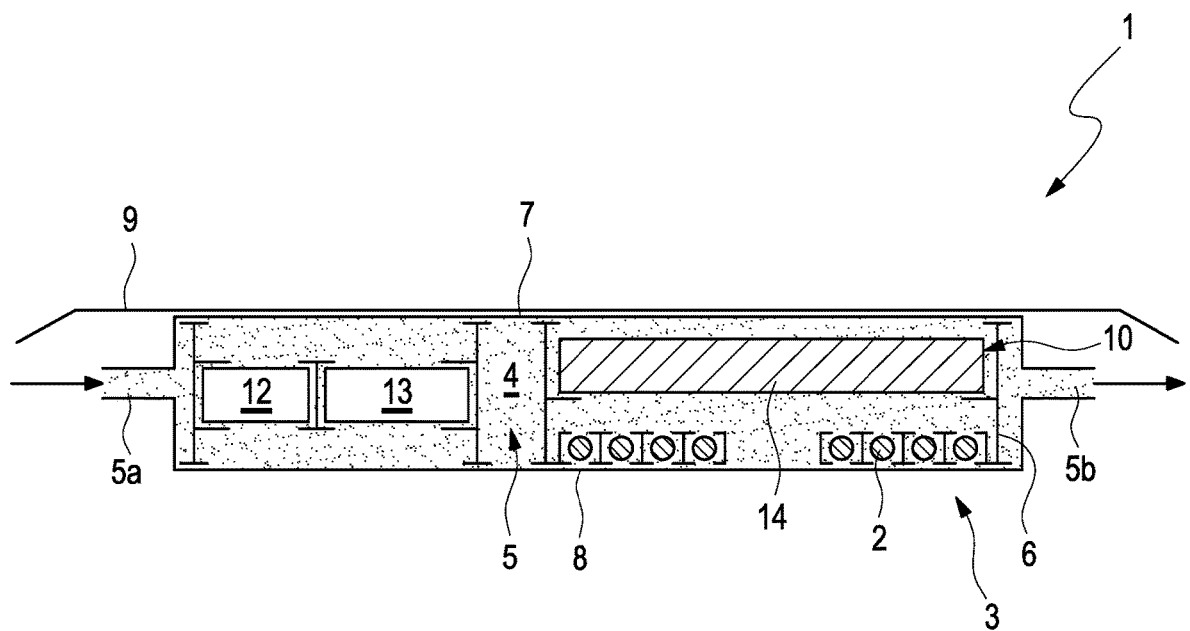
FIG. 4 shows a sectional view of an induction charging device according to the invention comprising an oscillating circuit unit and comprising a power electronics unit, which are arranged in a fluid pipe.

FIG. 4 shows a sectional view of the induction charging device 1 according to the invention, wherein the oscillating circuit unit 12 and the power electronics unit 13 are secured in the fluid duct 5 by means of the retaining device 6 here. The waste heat generated in the oscillating circuit unit 12 and in the power electronics unit 13 can be discharged directly to the fluid 4 in the fluid pipe 5, and the oscillating circuit unit 12 and the power electronics unit 13 are cooled better. The oscillating circuit unit 12 and the power electronics unit 13 are arranged upstream of the charging coil 2 in the fluid pipe 5 such that the fluid 4 flows around them upstream of the charging coil 2. The oscillating circuit unit 12 and the power electronics unit 13 can be cooled in the fluid pipe 5 in this way, and the fluid 4 can be heated around the charging coil 2—as soon as the latter is used as the resistance heater.

In summary, the charging coil 2 can be cooled effectively in the induction charging device 1 according to the invention, and the charging power of the charging coil 2 can be increased in an advantageous manner.

The induction charging device 1 was described in FIG. 1 to FIG. 4 for the use of the charging coil 2 as a secondary coil. However, the induction charging device 1 is also suitable for use of the charging coil 2 as a primary coil without any limitation. For this purpose, the induction charging device 1 can be arranged in such a way that the metal shielding plate 9 for shielding electromagnetic field emissions and the ferrite assembly 10 for directing the electromagnetic alternating field are arranged on the charging coil 2 facing away from the vehicle.

The invention claimed is:

1. An induction charging device for a partially or fully electrically operated motor vehicle, comprising:
   at least one charging coil and a temperature-control assembly comprising a fluid pipe, through which a liquid fluid is flowable,
   the at least one charging coil being inductively couplable to a primary coil such that a battery can be inductively charged,
   the at least one charging coil heat-transmittingly connected to the fluid pipe of the temperature-control assembly such that the waste heat from the at least one charging coil can be transmitted to the fluid in the fluid pipe of the temperature-control assembly, a metal shielding plate for shielding electromagnetic field emissions, and a ferrite assembly for directing an electromagnetic alternating field, the metal shielding plate and the ferrite assembly arranged on a vehicle side on the at least one charging coil, wherein the at least one charging coil is arranged in the fluid pipe of the temperature-control assembly such that the fluid can flow around the at least one charging coil on all sides such that the waste heat generated in the at least one charging coil can be discharged directly to the fluid in the fluid pipe, and wherein the at least one charging coil is secured in the fluid pipe of the temperature-control assembly directly to the fluid pipe or via a retaining device.

2. The induction charging device according to claim 1, wherein:

the ferrite assembly is arranged in the fluid pipe of the temperature-control assembly such that the fluid can flow around the ferrite assembly on all sides, and the ferrite assembly in the fluid pipe is secured directly to the fluid pipe or via a retaining device.

3. The induction charging device according to claim 1, wherein:

the fluid pipe has a shell-shaped metallic cover and a shell-shaped lower shell that are secured to one another in a fluid-tight manner, and on the vehicle side, the shell-shaped metallic cover encloses the at least one charging coil towards the shell-shaped lower shell, and provides the metal shielding plate.

4. The induction charging device according to claim 1, further comprising at least one of an oscillating circuit unit and a power electronics unit.

5. The induction charging device according to claim 4, wherein the at least one of the oscillating circuit unit and the power electronics unit are secured on the vehicle side or on a charging coil side on the metal shielding plate.

6. The induction charging device according to claim 4, wherein:

the at least one of the oscillating circuit unit and the power electronics unit are arranged in the fluid pipe of the temperature-control assembly such that the fluid can flow around them on all sides, and the at least one of the oscillating circuit unit and the power electronics unit in the fluid pipe are secured directly to the fluid pipe or via a retaining device.

7. The induction charging device according to claim 1, wherein at least one of:

the at least one charging coil is electrically insulated from the fluid, and the fluid flowing in the fluid pipe is an electrical insulator.

8. The induction charging device according to claim 1, wherein the at least one charging coil is conductively connected to the battery such that a battery direct current flows through the at least one charging coil, and the at least one charging coil forms a resistance heater for heating the fluid, which flows around the at least one charging coil in the fluid pipe.

9. The induction charging device according to claim 4, wherein the at least one of the oscillating circuit unit and the power electronics unit are arranged upstream of the at least one charging coil in the fluid pipe such that the fluid in the fluid pipe can flow around the at least one of the oscillating circuit unit and the power electronics unit upstream of the at least one charging coil.

10. The induction charging device according to claim 1, wherein:

the fluid is capable of flowing through the fluid pipe of the temperature-control assembly from a fluid inlet to a fluid outlet, and the temperature-control assembly is capable of being fluidically connected to a vehicle cooling system via the fluid inlet and via the fluid outlet of the fluid pipe.

11. The induction charging device according to claim 1, wherein the at least one charging coil is secured in the fluid pipe via the retaining device, and wherein the retaining device holds the at least one charging coil at a distance from the ferrite assembly and from the fluid pipe.

12. The induction charging device according to claim 4, wherein the at least one of the oscillating circuit unit and the power electronics unit are electrically insulated from the fluid.

13. A partially or fully electrically operated motor vehicle, comprising: an induction charging device, including:

at least one charging coil and a temperature-control assembly comprising a fluid pipe, through which a liquid fluid is flowable, the at least one charging coil being inductively couplable to a primary coil such that a battery can be inductively charged in the motor vehicle, the at least one charging coil heat-transmittingly connected to the fluid pipe of the temperature-control assembly such that the waste heat from the at least one charging coil can be transmitted to the fluid in the fluid pipe of the temperature-control assembly, a metal shielding plate for shielding electromagnetic field emissions, and a ferrite assembly for directing an electromagnetic alternating field, the metal shielding plate and the ferrite assembly arranged on a vehicle side on the at least one charging coil, wherein the at least one charging coil is arranged in the fluid pipe of the temperature-control assembly such that the fluid can flow around the at least one charging coil on all sides such that the waste heat generated in the at least one charging coil can be discharged directly to the fluid in the fluid pipe, and wherein the at least one charging coil is secured in the fluid pipe of the temperature-control assembly directly to the fluid pipe or via a retaining device.

14. The partially or fully electrically operated motor vehicle according to claim 13, wherein:

the ferrite assembly is arranged in the fluid pipe of the temperature-control assembly such that the fluid can flow around the ferrite assembly on all sides, and the ferrite assembly in the fluid pipe is secured directly to the fluid pipe or via a retaining device.

15. The partially or fully electrically operated motor vehicle according to claim 13, wherein:

the fluid pipe has a shell-shaped metallic cover and a shell-shaped lower shell that are secured to one another in a fluid-tight manner, and the retaining device secures the at least one charging coil in the fluid pipe at a distance from the shell-shaped metallic cover and the shell-shaped lower shell.

16. The partially or fully electrically operated motor vehicle according to claim 13, further comprising at least one of an oscillating circuit unit and a power electronics unit.

17. The partially or fully electrically operated motor vehicle according to claim 16, wherein the at least one of the oscillating circuit unit and the power electronics unit are secured on the vehicle side or on a charging coil side on the metal shielding plate.

18. The partially or fully electrically operated motor vehicle according to claim 16, wherein:
   the at least one of the oscillating circuit unit and the power electronics unit are arranged in the fluid pipe of the temperature-control assembly such that the fluid can flow around them on all sides, and
   the at least one of the oscillating circuit unit and the power electronics unit in the fluid pipe are secured directly to the fluid pipe or via a retaining device.

19. The partially or fully electrically operated motor vehicle according to claim 13, wherein the at least one charging coil is electrically insulated from the fluid.

20. The induction charging device according to claim 1, wherein the at least one charging coil is arranged in the fluid pipe in a fluid flow path between a fluid inlet and a fluid outlet of the fluid pipe.

\* \* \* \* \*